United States Patent
Linsmeier et al.

(10) Patent No.: US 12,122,231 B2
(45) Date of Patent: Oct. 22, 2024

(54) INTEGRATED PUMP TRANSMISSION WITH DRIVELINE BRAKE

(71) Applicant: Oshkosh Corporation, Oshkosh, WI (US)

(72) Inventors: Eric Linsmeier, Larsen, WI (US); David Fieber, Neenah, WI (US); Seth Newlin, Appleton, WI (US)

(73) Assignee: Oshkosh Corporation, Oshkosh, WI (US)

( * ) Notice: Subject to any disclaimer, the term of this patent is extended or adjusted under 35 U.S.C. 154(b) by 5 days.

(21) Appl. No.: 18/134,254

(22) Filed: Apr. 13, 2023

(65) Prior Publication Data

US 2023/0241968 A1 Aug. 3, 2023

Related U.S. Application Data

(63) Continuation-in-part of application No. 17/987,006, filed on Nov. 15, 2022.

(60) Provisional application No. 63/335,681, filed on Apr. 27, 2022, provisional application No. 63/279,944, filed on Nov. 16, 2021.

(51) Int. Cl.
*B60K 25/02* (2006.01)
*A62C 27/00* (2006.01)
*B60K 17/28* (2006.01)
*F16D 65/28* (2006.01)

(52) U.S. Cl.
CPC .............. *B60K 17/28* (2013.01); *A62C 27/00* (2013.01); *B60K 25/02* (2013.01); *F16D 65/28* (2013.01); *B60K 2025/022* (2013.01)

(58) Field of Classification Search
CPC .. B60K 25/06; B60K 25/02; B60K 2025/022; B60K 17/28; F16D 65/28
See application file for complete search history.

(56) References Cited

U.S. PATENT DOCUMENTS

| | | | |
|---|---|---|---|
| 6,712,652 B2 * | 3/2004 | Roycroft | B60F 3/0007 440/38 |
| 9,145,053 B2 | 9/2015 | Mettler et al. | |
| 10,435,026 B2 * | 10/2019 | Shively | B60K 25/06 |
| 2002/0098748 A1 * | 7/2002 | Roycroft | B60F 3/0007 440/12.51 |
| 2004/0002794 A1 | 1/2004 | Pillar et al. | |
| 2004/0199302 A1 | 10/2004 | Pillar et al. | |
| 2005/0234622 A1 | 10/2005 | Pillar et al. | |

(Continued)

FOREIGN PATENT DOCUMENTS

| | | | |
|---|---|---|---|
| CN | 2921129 Y | * | 7/2007 |
| CN | 203412527 U | * | 1/2014 |

(Continued)

*Primary Examiner* — Drew J Brown
*Assistant Examiner* — Maxwell L Meshaka
(74) *Attorney, Agent, or Firm* — Foley & Lardner LLP

(57) ABSTRACT

A fire apparatus includes a chassis, a cab coupled to the chassis, a pump system coupled to the chassis and positioned at least partially behind the cab, and a driveline. The driveline includes a prime mover positioned beneath the cab and coupled to the chassis, a transmission, a sandwiched power take-off unit, and a brake system. The sandwiched power take-off unit is positioned between (a) the prime mover and (b) the transmission and the pump system. The brake system is positioned between the sandwiched power take-off unit and the pump system.

20 Claims, 13 Drawing Sheets

(56) References Cited

U.S. PATENT DOCUMENTS

| | | |
|---|---|---|
| 2006/0022001 A1 | 2/2006 | Linsmeier et al. |
| 2006/0032701 A1 | 2/2006 | Linsmeier et al. |
| 2006/0032702 A1 | 2/2006 | Linsmeier et al. |
| 2006/0065411 A1 | 3/2006 | Linsmeier et al. |
| 2006/0086566 A1 | 4/2006 | Linsmeier et al. |
| 2008/0114513 A1 | 5/2008 | Pillar et al. |
| 2009/0033044 A1 | 2/2009 | Linsmeier |
| 2009/0095545 A1 | 4/2009 | Crabtree et al. |
| 2014/0262355 A1 | 9/2014 | Linsmeier |
| 2018/0215354 A1 | 8/2018 | Linsmeier et al. |
| 2018/0215597 A1 | 8/2018 | Linsmeier et al. |
| 2018/0222484 A1* | 8/2018 | Shively ................ B60K 5/08 |
| 2018/0289999 A1 | 10/2018 | Kay et al. |
| 2018/0293818 A1 | 10/2018 | Linsmeier et al. |
| 2018/0297597 A1 | 10/2018 | Linsmeier et al. |
| 2019/0015692 A1 | 1/2019 | Fieber et al. |
| 2019/0262646 A1 | 8/2019 | Linsmeier et al. |
| 2019/0263408 A1 | 8/2019 | Linsmeier et al. |
| 2019/0359184 A1 | 11/2019 | Linsmeier et al. |
| 2019/0359460 A1 | 11/2019 | Linsmeier et al. |
| 2020/0108285 A1 | 4/2020 | Kay et al. |
| 2020/0238115 A1 | 7/2020 | Linsmeier et al. |
| 2020/0279444 A1 | 9/2020 | Linsmeier et al. |
| 2021/0107361 A1 | 4/2021 | Linsmeier et al. |
| 2021/0253102 A1 | 8/2021 | Linsmeier et al. |
| 2021/0339065 A1 | 11/2021 | Linsmeier et al. |
| 2022/0009761 A1 | 1/2022 | Archer et al. |
| 2022/0024425 A1 | 1/2022 | Linsmeier et al. |
| 2022/0072354 A1 | 3/2022 | Fieber et al. |
| 2022/0074417 A1 | 3/2022 | Linsmeier et al. |
| 2022/0080944 A1 | 3/2022 | Linsmeier et al. |
| 2022/0097527 A1 | 3/2022 | Koga et al. |
| 2022/0097961 A1 | 3/2022 | Koga et al. |
| 2022/0097964 A1 | 3/2022 | Koga et al. |
| 2022/0112061 A1 | 4/2022 | Archer et al. |
| 2022/0185582 A1 | 6/2022 | Koga et al. |
| 2022/0193473 A1 | 6/2022 | Kay et al. |
| 2022/0309844 A1 | 9/2022 | Linsmeier et al. |
| 2022/0355140 A1 | 11/2022 | Linsmeier et al. |
| 2022/0355141 A1 | 11/2022 | Linsmeier et al. |
| 2022/0355142 A1 | 11/2022 | Linsmeier et al. |
| 2022/0355690 A1 | 11/2022 | Linsmeier et al. |
| 2022/0379892 A1* | 12/2022 | Archer ................ B60W 30/188 |
| 2023/0149754 A1* | 5/2023 | Linsmeier ............. B60K 25/02 169/24 |
| 2023/0241968 A1* | 8/2023 | Linsmeier ............. F16D 65/28 180/53.1 |
| 2024/0035254 A1* | 2/2024 | Linsmeier ............. E02F 9/205 |
| 2024/0149086 A1* | 5/2024 | Linsmeier .......... B60R 16/0238 |
| 2024/0149087 A1* | 5/2024 | Archer ................ H01M 50/298 |
| 2024/0149088 A1* | 5/2024 | Archer .................... E06C 5/04 |
| 2024/0149089 A1* | 5/2024 | Archer ................... A62C 27/00 |
| 2024/0149658 A1* | 5/2024 | Archer .................... B60L 58/18 |
| 2024/0149659 A1* | 5/2024 | Archer ..................... B60K 6/40 |
| 2024/0149708 A1* | 5/2024 | Archer ................ H01M 50/298 |
| 2024/0149709 A1* | 5/2024 | Archer ................ H01M 50/298 |
| 2024/0149710 A1* | 5/2024 | Newlin .................... E06C 5/04 |
| 2024/0149711 A1* | 5/2024 | Archer .................. B60W 20/40 |
| 2024/0149815 A1* | 5/2024 | Archer ................. B62D 21/157 |
| 2024/0149864 A1* | 5/2024 | Linsmeier ............... B60K 6/28 |
| 2024/0149948 A1* | 5/2024 | Archer ................... A62C 27/00 |
| 2024/0149965 A1* | 5/2024 | Archer ............. B60R 16/0238 |

FOREIGN PATENT DOCUMENTS

| | | | | |
|---|---|---|---|---|
| CN | 203715464 U | * | 7/2014 | |
| CN | 204023465 U | * | 12/2014 | |
| CN | 205108842 U | * | 3/2016 | |
| CN | 205445580 U | * | 8/2016 | |
| CN | 207772980 U | * | 8/2018 | |
| CN | 111350459 A | * | 6/2020 | .......... E21B 15/003 |
| CN | 113511286 A | * | 10/2021 | |
| CN | 215663727 U | * | 1/2022 | |
| CN | 115520009 A | * | 12/2022 | |
| JP | H11189172 A | * | 7/1999 | |
| JP | 2002017124 A | * | 1/2002 | |
| JP | 2002019410 A | * | 1/2002 | |
| JP | 7192650 B2 | * | 12/2022 | |
| KR | 102448686 B1 | * | 9/2022 | |
| WO | WO-2007/108805 A1 | | 9/2007 | |

\* cited by examiner

INTEGRATED PUMP TRANSMISSION WITH DRIVELINE BRAKE

CROSS-REFERENCE TO RELATED PATENT APPLICATIONS

This application is a continuation-in-part of Ser. No. 17/987,006, filed Nov. 15, 2022, which claims the benefit of and priority to (a) U.S. Provisional Patent Application No. 63/279,944, filed Nov. 16, 2021 and (b) U.S. Provisional Patent Application No. 63/335,681, filed Apr. 27, 2022, all of which are incorporated herein by reference in their entireties.

BACKGROUND

A fire apparatus can include an on-board pump system that pumps a fluid (e.g., water) from a water source (e.g., a water tank, a fire hydrant, etc.) to one or more outputs of the fire apparatus. Such pump systems are typically driven using an engine PTO or are positioned downstream of transmission.

SUMMARY

One embodiment relates to a fire apparatus. The fire apparatus includes a chassis, a cab coupled to the chassis, a pump system coupled to the chassis and positioned at least partially behind the cab, and a driveline. The driveline includes a prime mover positioned beneath the cab and coupled to the chassis, a transmission, a sandwiched power take-off unit, and a brake system. The sandwiched power take-off unit is positioned between (a) the prime mover and (b) the transmission and the pump system. The brake system is positioned between the sandwiched power take-off unit and the pump system.

Another embodiment relates to a fire apparatus. The fire apparatus includes a pump system and a driveline. The driveline includes a prime mover, a transmission, a sandwiched power take-off unit, and a brake system. The sandwiched power take-off unit includes a housing, a main drive shaft positioned within the housing and between the prime mover and the transmission, a pump drive shaft positioned outside of the housing and coupled to a pump input of the pump system, a gear train including a plurality of gears that couple the main drive shaft to the pump drive shaft, and a clutch positioned to decouple the main drive shaft from the gear train. The brake system is configured to provide a holding force to facilitate holding the pump system in a stopped state.

Still another embodiment relates to a fire apparatus. The fire apparatus includes a pump system, a driveline, and a controller. The driveline includes a prime mover, a transmission, a sandwiched power take-off unit, a connecting shaft, and a brake system. The sandwiched power-takeoff unit includes a housing, a main drive shaft positioned within the housing and between the prime mover and the transmission, a pump drive shaft positioned outside of the housing and coupled to a pump input of the pump system, a gear train including a plurality of gears that couple the main drive shaft to the pump drive shaft, and a clutch positioned to decouple the main drive shaft from the gear train. The connecting shaft extends between the pump drive shaft and the pump input. The brake system is positioned at or along at least one of the pump drive shaft, the connecting shaft, or the pump input. The controller is configured to automatically engage the brake system in response to (i) the pump system being deactivated and (ii) at least one of (a) a speed of the pump system being less than a threshold braking speed or (b) an elapsed time since deactivation being greater than a time threshold to provide a holding force with the brake system to facilitate holding the pump system in a stopped state.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle

Figure 1:
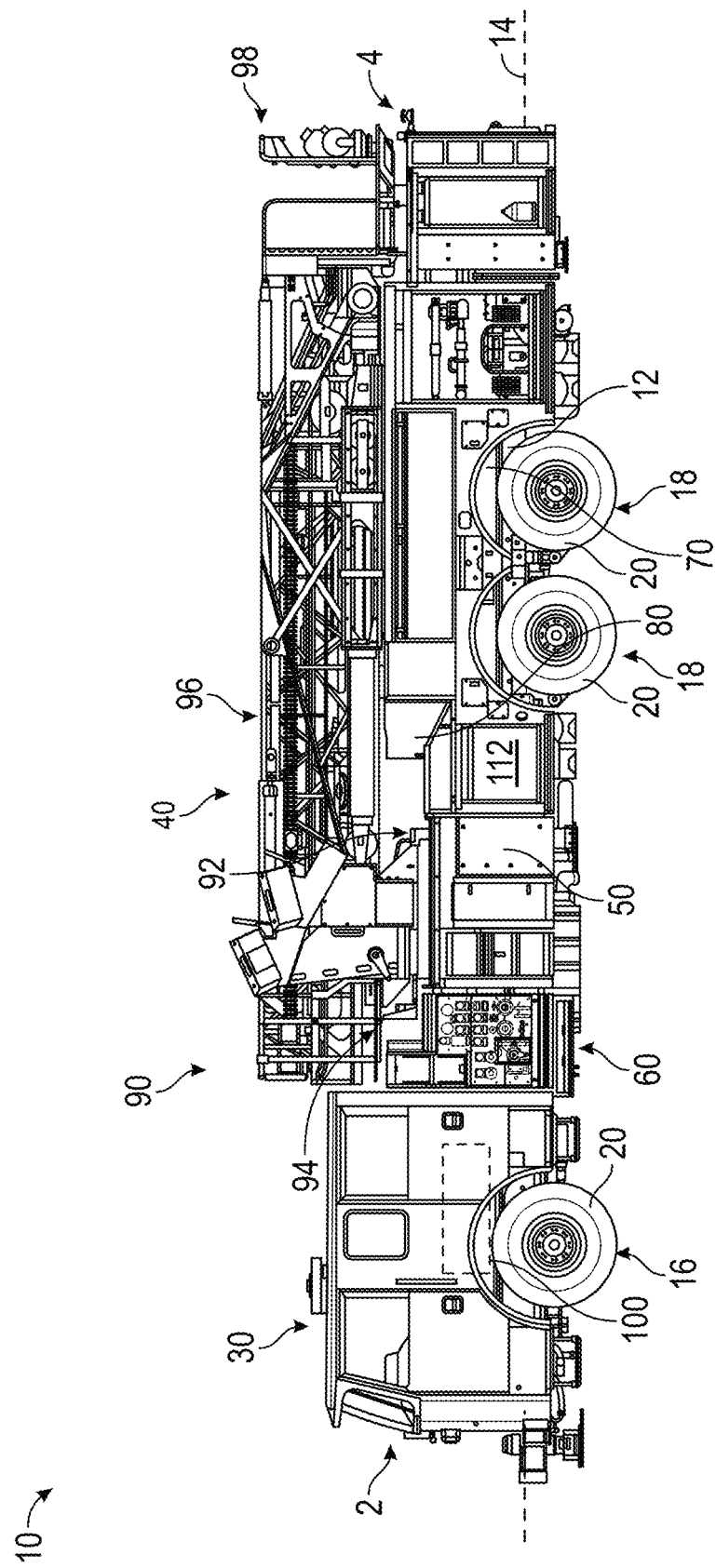
FIG. 1 is a side view of a vehicle, according to an exemplary embodiment.

According to the exemplary embodiment shown in FIG. 1, a vehicle, shown as fire apparatus 10, is configured as a mid-mount quint fire truck having a tandem rear axle. A "quint" fire truck as used herein may refer to a fire truck that includes a water tank, an aerial ladder, hose storage, ground ladder storage, and a water pump. In other embodiments, the fire apparatus 10 is configured as a mid-mount quint fire truck having a single rear axle. A tandem rear axle may include two solid axle configurations or may include two pairs of axles (e.g., two pairs of half shafts, etc.) each having a set of constant velocity joints and coupling two differentials to two pairs of hub assemblies. A single rear axle chassis may include one solid axle configuration or may include one pair of axles each having a set of constant velocity joints and coupling a differential to a pair of hub assemblies, according to various alternative embodiments. In still other embodiments, the fire apparatus 10 is configured as a non-quint mid-mount fire truck having a single rear axle or a tandem rear axle. According to the exemplary embodiment shown in FIG. 2, the fire apparatus 10 is configured as a rear-mount, quint, single rear axle fire truck. In yet other embodiments, the fire apparatus 10 is configured as a rear-mount, quint or non-quint, single rear axle or tandem rear axle fire truck. In yet other embodiments, the fire apparatus does not include an aerial ladder (e.g., a pumper, a fire engine, etc.). In still other embodiments, the vehicle is not a fire truck, but is any other type of vehicle (e.g., a concrete mixer truck, a refuse truck, etc.) that can include a sandwiched PTO unit similar to the fire apparatus 10, as described in greater detail herein.

Figure 2:
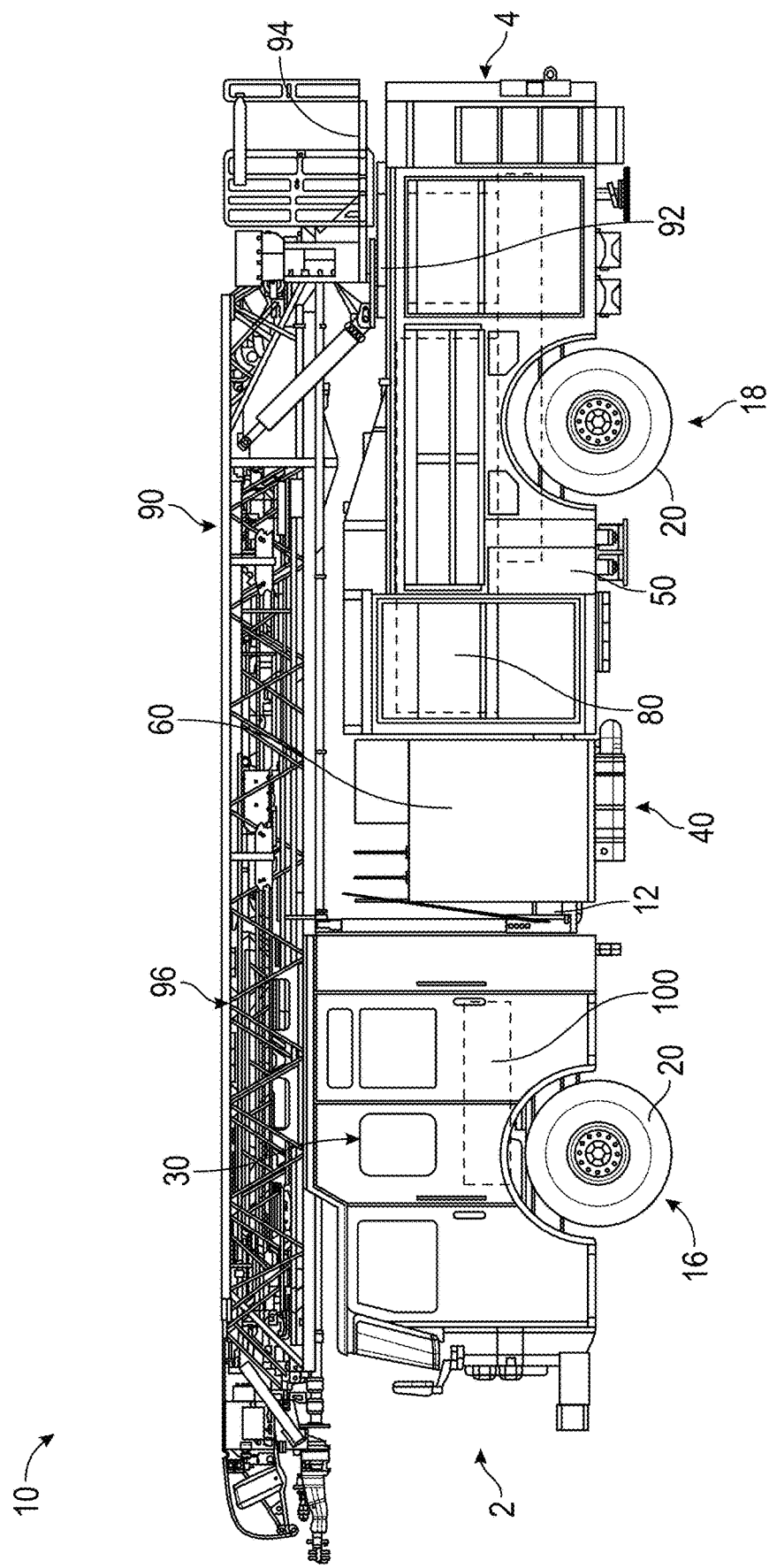
FIG. 2 is a side view of a vehicle, according to another exemplary embodiment.

As shown in FIGS. 1 and 2, the fire apparatus 10 includes a chassis, shown as frame 12, having longitudinal frame rails that define an axis, shown as longitudinal axis 14, that extends between a first end, shown as front end 2, and an opposing second end, shown as rear end 4, of the fire apparatus 10; a first axle, shown as front axle 16, coupled to the frame 12; one or more second axles, shown as rear axles 18, coupled to the frame 12; a first assembly or cab assembly, shown as front cabin 30, coupled to and supported by the frame 12; a second assembly, shown as rear assembly 40, coupled to and supported by the frame 12; and a powertrain, shown as driveline 100, coupled to and supported by the frame 12.

As shown in FIGS. 1 and 2, the front axle 16 and the rear axles 18 include tractive assemblies, shown as wheel and tire assemblies 20. As shown in FIGS. 1 and 2, the front cabin 30 is positioned forward of the rear assembly 40 (e.g., with respect to a forward direction of travel for the fire apparatus 10 along the longitudinal axis 14, etc.). According to an alternative embodiment, at least a portion of the cab assembly may be positioned behind the rear assembly 40 (e.g., with respect to a forward direction of travel for the fire apparatus 10 along the longitudinal axis 14, etc.). The cab assembly may be positioned behind the rear assembly 40 on, by way of example, a rear tiller fire apparatus. In some embodiments, the fire apparatus 10 is a ladder truck with a front portion that includes the front cabin 30 pivotally coupled to a rear portion that includes the rear assembly 40 (i.e., the rear portion is towed by the front portion).

As shown in FIGS. 1 and 2, the rear assembly 40 includes a body assembly, shown as body 50, coupled to and supported by the frame 12; a fluid driver, shown as pump system 60, coupled to and supported by the frame 12; a chassis support member, shown as torque box 70, coupled to and supported by the frame 12; a fluid reservoir, shown as water tank 80, coupled to the body 50 and supported by the torque box 70 and/or the frame 12; and an aerial assembly, shown as aerial assembly 90, pivotally coupled to the torque box 70 and supported by the torque box 70 and/or the frame 12. In some embodiments, the rear assembly 40 additionally or alternatively includes an agent or foam tank (e.g., that receives and stores a fire suppressing agent, foam, etc.). In some embodiments, the rear assembly 40 does not include the torque box 70, the water tank 80, and/or the aerial assembly 90.

According to an exemplary embodiment, the pump system 60 includes a housing that supports a pump that is configured to drive fluid (e.g., water, agent, etc.) from a fluid source (e.g., the water tank 80, the agent tank, an external source such as a fire hydrant, etc.) to one or more fluid outlets of the fire apparatus 10 (e.g., a structural hose outlet along the body 50; a deluge gun, cannon, or turret; a hose reel; etc.). According to an exemplary embodiment, the pump system 60 is a midship mounted pump system that (i) is located at or proximate the middle of the fire apparatus 10 (e.g., between the front axle 16 and the rear axle(s) 18) and (ii) is part of the driveline 100 of the fire apparatus 10.

Figure 9:
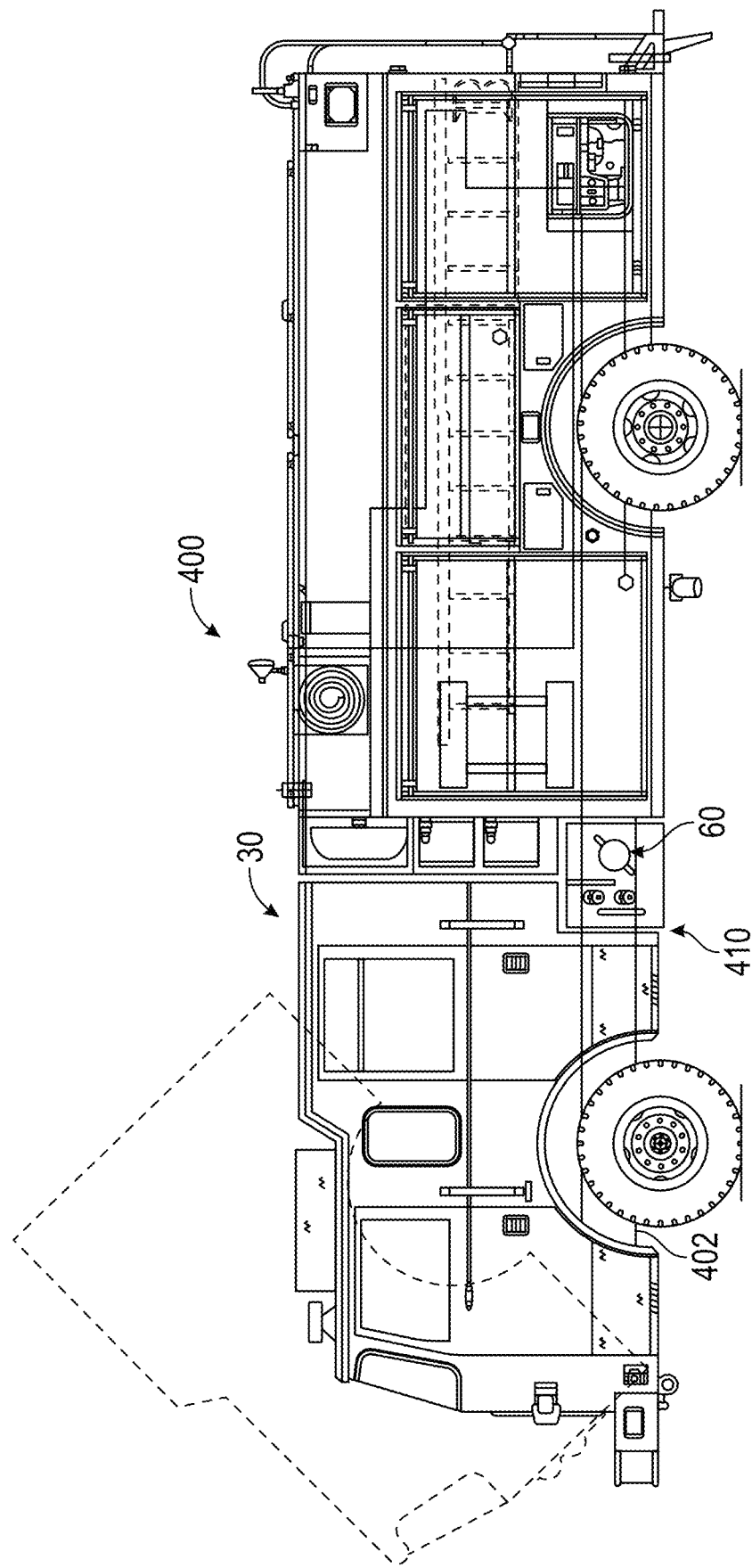
FIGS. 9-11 are side views of a vehicle, according to another exemplary embodiment.
Figure 10:
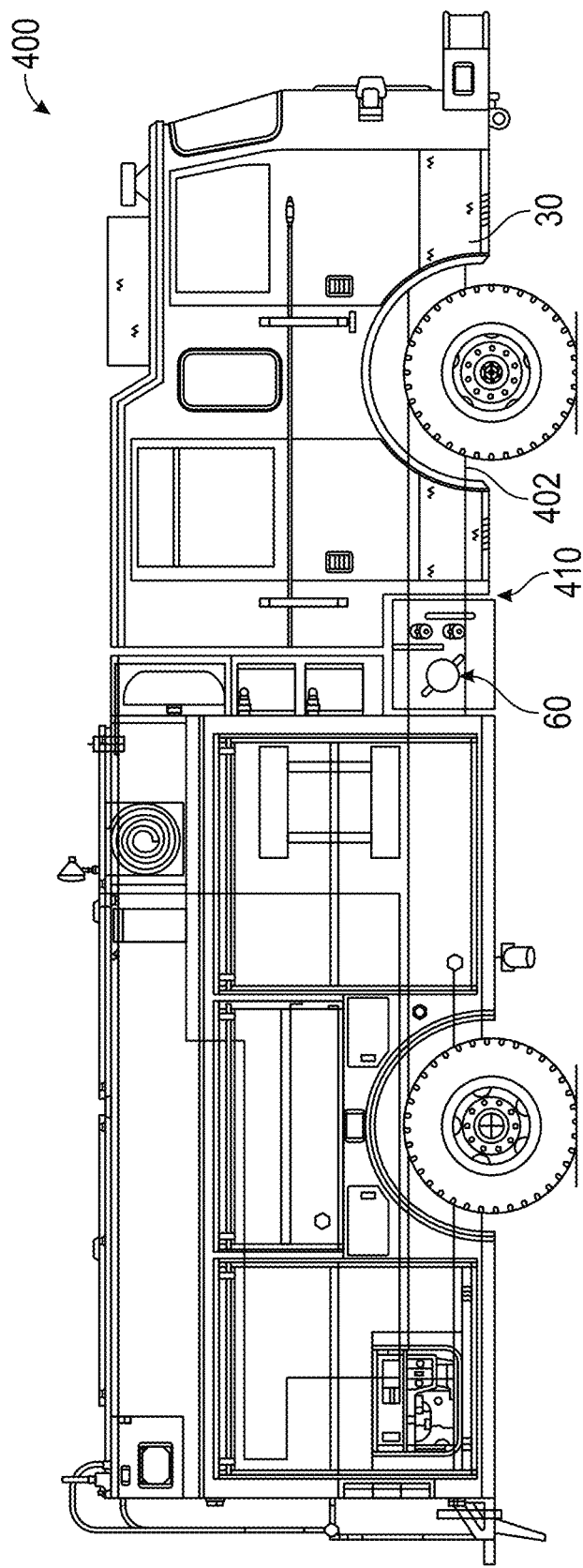
Figure 11:
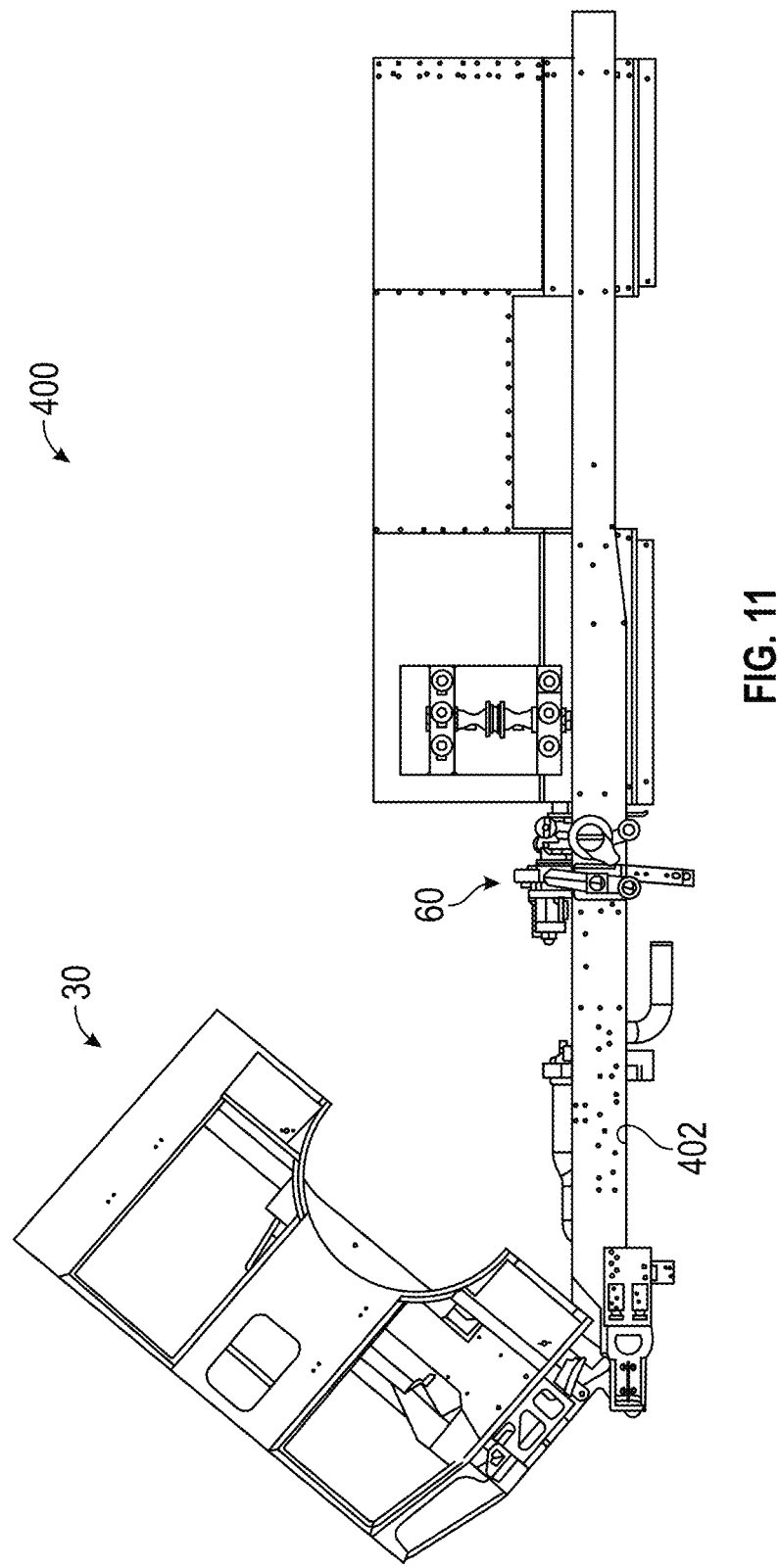

A fire apparatus 400 is shown in FIGS. 9-11 according to an alternative embodiment. The fire apparatus 400 may be substantially similar to the fire apparatus 10, except as otherwise specified herein. In the fire apparatus 400, the pump system 60 is positioned at least partially beneath or below the front cabin 30 (e.g., partially beneath the front cabin 30, entirely beneath the front cabin 30). In some embodiments, a footprint of the front cabin 30 partially encompasses or contains the pump system 60 (e.g., such that a portion of the pump system 60 extends beyond the footprint of the front cabin 30). In other embodiments, the footprint of the front cabin 30 entirely or completely encompasses or contains the pump system 60. Accordingly, the front cabin 30 may be supported above or otherwise disposed over at least a portion of the pump system 60.

In some embodiments, the pump system 60 may be at least partially supported within a cavity (e.g., along a centerline of fire apparatus 400, etc.) defined by the longitudinal frame rails 402 of the fire apparatus 400. The pump system 60 may at least partially extend above the frame rails 402. The front cabin 30 may be configured to accommodate the positioning of the pump system 60 at least partially above the frame rails 402. For example, a bottom portion of the front cabin 30 may include a raised portion or raised floor that protrudes into the occupant compartment and defines an area (e.g., cavity, chamber, tunnel, etc.) configured to receive at least a portion of the pump system 60. This may include a portion extending in longitudinally along a centerline of the front cabin 30 (e.g., a tunnel, shroud, doghouse, etc.) and/or a portion or raised floor extending laterally along a rear portion of the front cabin 30 (e.g., a rear seat box, EMS compartment, storage receptacle, etc.).

The pump system 60 may be positioned such that a main portion of the pump system 60 (e.g., a fire pump and a gear case, etc.) is positioned under the rear portion of front cabin 30. To facilitate the positioning of pump system 60 under the front cabin 30, a rear wall of the front cabin 30 may include a central cutout portion that extends upward from a bottom edge and is sized to conform to or otherwise receive a portion of the pump system 60 (e.g., a pump housing, etc.). To further accommodate the positioning of pump system 60, the left and right sides of the front cabin 30 may define a cutout portion 410 at their respective bottom rear corners. The cutout portion 410 is provided to permit a portion of a fluid routing system of the pump system 60 to be supported under the front cabin 30.

In some embodiments, the front cabin 30 is movably (e.g., tiltably, slidably, removably, etc.) coupled to the frame 12. The front cabin 30 may be selectively repositionable between a first or transit position (shown in solid lines in FIG. 9) and a second or service position (shown in dashed lines in FIG. 9). The front cabin 30 may be repositionable using one or more actuators (e.g., hydraulic cylinders, electric linear actuators, etc.). In the service position, systems positioned beneath the front cabin 30 (e.g., the pump system 60, etc.) are more accessible from above the frame 12 than would otherwise be if the front cabin 30 was in the transit position. Movably supporting the front cabin 30 relative to the frame 12 facilitates relatively unrestricted or otherwise convenient access to systems (e.g., the pump system 60, etc.) that may be supported at least partially under the front cabin 30.

As shown in FIGS. 1 and 2, the aerial assembly 90 includes a turntable assembly, shown as turntable 92, pivotally coupled to the torque box 70; a platform, shown work platform 94, coupled to the turntable 92; a ladder assembly, shown as aerial ladder assembly 96, having a first end (e.g., a base end, a proximal end, a pivot end, a platform end, etc.) pivotally coupled to the turntable 92, and an opposing second end (e.g., a free end, a distal end, an implement end, etc.); and an implement, shown as work basket 98, coupled to the opposing second end of the aerial ladder assembly 96. In some embodiments, as shown in FIG. 2, the aerial assembly 90 does not include the work basket 98. In some embodiments, the work basket 98 is replaced with or additionally includes a nozzle (e.g., a deluge gun, a water cannon, a water turret, etc.) or other tool/implement. By way of example, the nozzle may be connected to a water source (e.g., the water tank 80, an external source, a fire hydrant, etc.) with a conduit extending along the aerial ladder assembly 96 (e.g., along the side of the aerial ladder assembly 96, beneath the aerial ladder assembly 96, in a channel provided in the aerial ladder assembly 96, etc.). By pivoting the aerial ladder assembly 96 into a raised position, the nozzle may be elevated to expel water from a higher elevation to facilitate suppressing a fire. According to an exemplary embodiment, the aerial assembly 90 (e.g., the turntable 92, the work platform 94, the aerial ladder assembly 96, the work basket 98, etc.) is controllable (e.g., rotatable, pivotable, extendable, etc.) such that the aerial assembly 90 is selectively repositionable into a plurality of operating positions or orientations.

Driveline

According to an exemplary embodiment, the driveline 100 is configured to (i) propel the fire apparatus 10 and (ii) drive the pump system 60. As shown in FIGS. 3-5, 7, and 8, the driveline 100 includes a primary driver, shown as prime mover 110, and an energy storage device, shown as energy storage 120. In some embodiments, the driveline 100 is a conventional driveline whereby the prime mover 110 is an internal combustion engine and the energy storage 120 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 100 is an electric driveline whereby the prime mover 110 is an electric motor and the energy storage 120 is a battery system. In some embodiments, the driveline 100 is a fuel cell electric driveline whereby the prime mover 110 is an electric motor and the energy storage 120 is a fuel cell (e.g., that stores hydrogen, that produces electricity from the hydrogen, etc.). In some embodiments, the driveline 100 is a hybrid driveline whereby (i) the prime mover 110 includes an internal combustion engine and an electric motor/generator and (ii) the energy storage 120 includes a fuel tank and/or a battery system.

As shown in FIGS. 3-5, 7, and 8, the driveline 100 includes a transmission device (e.g., a gearbox, a continuous variable transmission ("CVT"), etc.), shown as transmission 130, and a first power divider (e.g., an integrated pump transmission), shown as sandwiched PTO unit 200, positioned between (i.e., sandwiched between) the prime mover 110 and the transmission 130, and coupled to the pump system 60. According to an exemplary embodiment, the prime mover 110 is positioned beneath the front cabin 30 and, therefore, the sandwiched PTO unit 200 is at least partially positioned beneath the front cabin 30. According to an exemplary embodiment, the sandwiched PTO unit 200 is configured to receive an input from the prime mover 110 and provide (i) a first output to the transmission 130 to drive the fire apparatus 10 and (ii) a second output to the pump system 60 to drive a pump thereof. In other embodiments (e.g., non-fire apparatus implementations, etc.), the second output of the sandwiched PTO unit 200 is provided to another type of vehicle system or vehicle accessory (e.g., an accessory drive, a compressor, etc.) other than the pump system 60. According to an exemplary embodiment, the transmission 130 has a variety of configurations (e.g., gear ratios, etc.) and provides different output speeds relative to an input received thereby from the sandwiched PTO unit 200.

Figure 3:
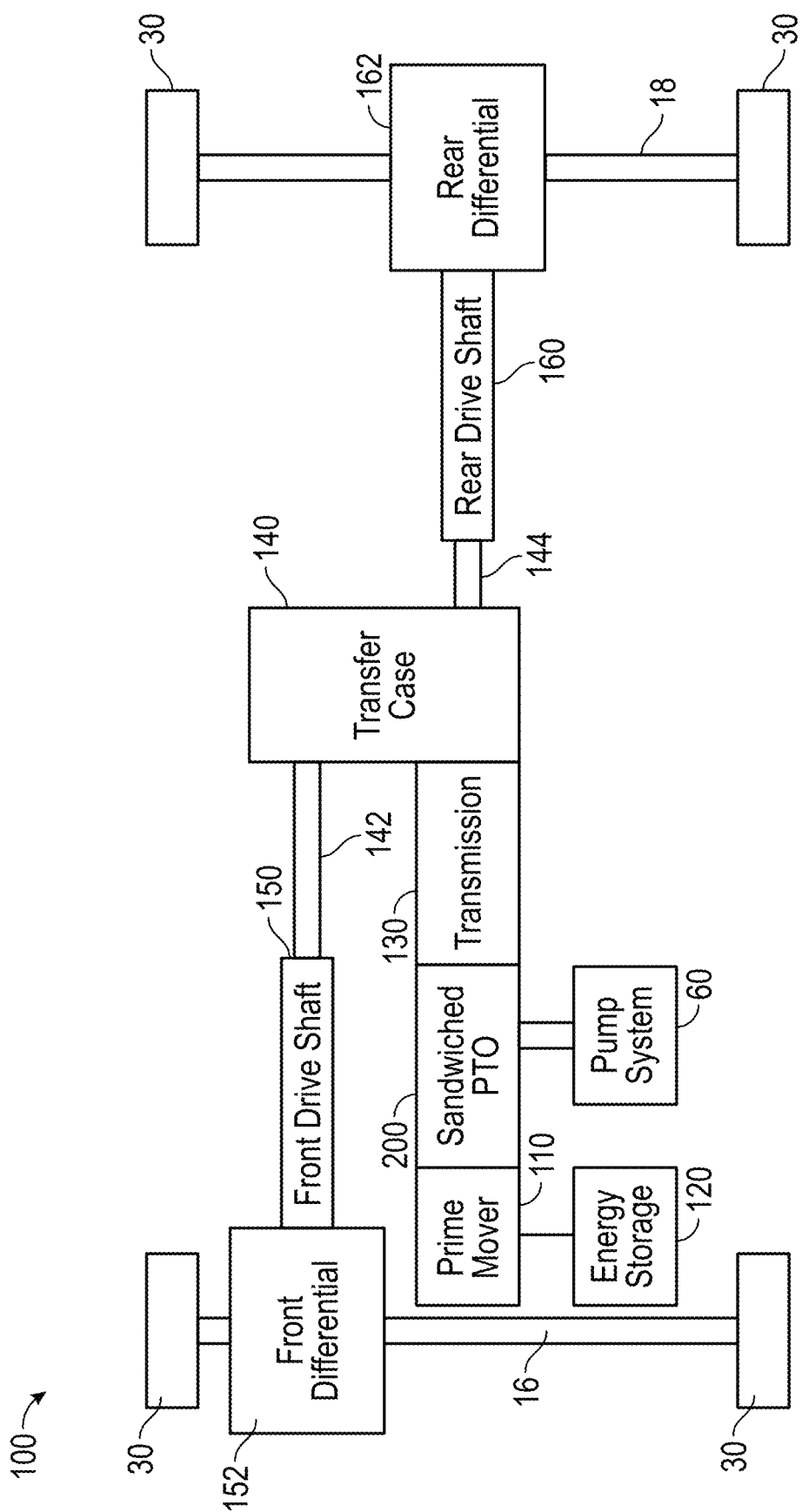
FIG. 3 is a schematic drawing of a driveline of the vehicle, according to an exemplary embodiment.
Figure 4:
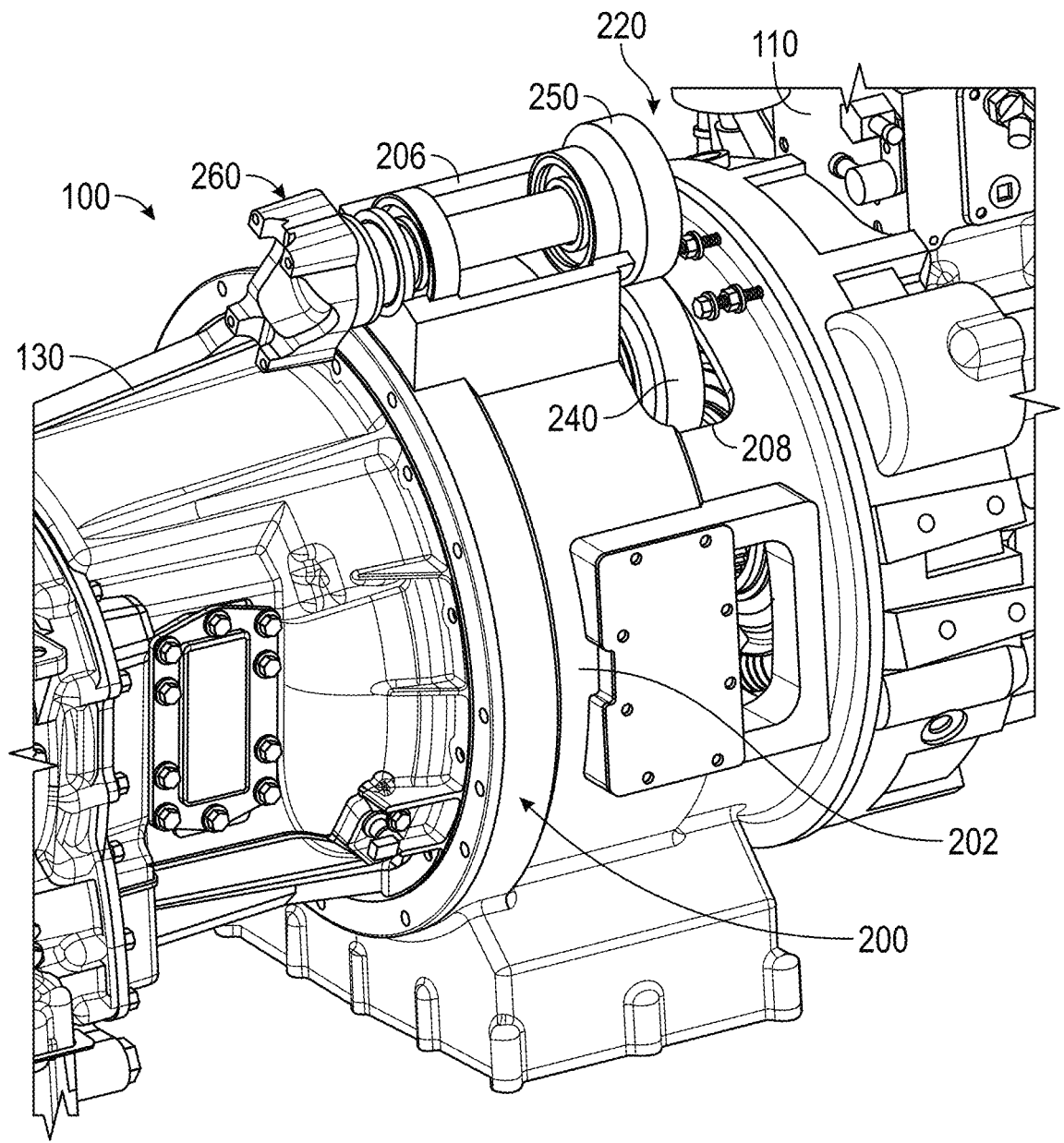
FIG. 4 is a perspective view of a portion of the driveline of FIG. 3 including a prime mover, a transmission, and a power divider positioned between the prime mover and the transmission, according to an exemplary embodiment.

As shown in FIG. 3, the driveline 100 additionally includes a second power divider, shown as transfer case 140, coupled to the transmission 130; a first drive shaft, shown as front drive shaft 150, coupled to a first or front output 142 of the transfer case 140; a first differential, shown as front differential 152, coupled to the front drive shaft 150 and the front axle 16; a second drive shaft, shown as rear drive shaft 160, coupled to a second or rear output 144 of the transfer case 140; and a second differential, shown as rear differential 162, coupled to the rear drive shaft 160 and the rear axle(s) 18. According to an exemplary embodiment, the transfer case 140 is configured to facilitate driving both the front axle 16 and the rear axle(s) 18 with the prime mover 110 to facilitate front and rear drive (e.g., an all-wheel-drive vehicle, a four-wheel-drive vehicle, etc.). In some embodiments, the transfer case 140 facilitates selectively engaging rear drive only, front drive only, and both front and rear drive simultaneously. In some embodiments, the transmission 130 and/or the transfer case 140 facilitate selectively disengaging the front axle 16 and the rear axle(s) 18 from the prime mover 110 (e.g., in a neutral mode of operation). In some embodiments (e.g., in electric driveline configurations, in hybrid driveline configurations, etc.), the driveline 100 does not include the transmission 130. In such embodiments, the sandwiched PTO unit 200 may be directly coupled to the transfer case 140. In some embodiments, the driveline 100 does not include the transfer case 140. In such embodiments, the transmission 130 may directly drive the front drive shaft 150 (i.e., a front-wheel-drive vehicle) or the rear drive shaft 160 (i.e., a rear-wheel-drive vehicle). In some embodiments, the driveline 100 does not include the front drive shaft 150 or the front differential 152 (e.g., a rear-wheel-drive vehicle). In some embodiments, the driveline 100 does not include the rear drive shaft 160 or the rear differential 162 (e.g., a front-wheel-drive vehicle).

Sandwiched PTO Unit

Traditionally, water pumps on fire apparatuses have been driven using a rear engine power take-off ("REPTO") or water pumps have been positioned along the driveline downstream of the transmission. However, REPTOs are limited in torque and horsepower output. Also, an arrangement with the water pump positioned downstream of the transmission requires a gear box or pump transfer case to be able to shift between a pump mode and a drive mode, which can complicate the driveline because of the addition of components and cause potential vibrations due to unfavorable layouts driven by packaging and driveline length constraints. Also, such arrangements can extend the length of the driveline.

According to an exemplary embodiment, the sandwiched PTO unit 200 reduces overall pump driveline components and simplifies the driveline by removing a pump transfer case and making the driveline angles more manageable. The sandwiched PTO unit 200 may also permit shortening the overall length of the driveline 100 relative to prior drivelines, allowing for shorter vehicle lengths. According to an exemplary embodiment, the sandwiched PTO unit 200 facilitates operating the pump of the pump system 60 independent of a gear selection of the transmission 130 and a ground speed of the fire apparatus 10, while operating at a higher torque and horsepower output. By way of example, the sandwiched PTO unit 200 may accommodate driving or being configured to drive more than a 1500 gallon-per-minute ("gpm") pump (e.g., greater than a 1,500 gpm pump; up to a 2,000 gpm pump; at least a 2,000 gpm pump, greater than an 2,000 gpm pump; etc.), while traditional pump drive designs can max out at 1,500 gpm pumps or less. In addition, the sandwiched PTO unit 200 accommodates engines or primary drivers that have either a clockwise or counterclockwise output.

As shown in FIGS. 4-8, the sandwiched PTO unit 200 includes a first housing, shown as main housing 202, defining an interior chamber, shown as main chamber 204; a second housing, shown as pump output housing 206, extending from the main housing 202; a first PTO drive shaft, shown as main drive shaft 210, disposed within and extending through the main chamber 204; a pump output or second PTO drive shaft, shown as pump drive shaft 260, at least partially disposed within, supported by, and extending from the pump output housing 206; and a gear train, shown as pump gear train 220, including a plurality of gears that couple the main drive shaft 210 to the pump drive shaft 260 by coupling to the main drive shaft 210, extending through an opening, shown as gear aperture 208, defined by the main housing 202, and coupling to the pump drive shaft 260.

Figure 5:
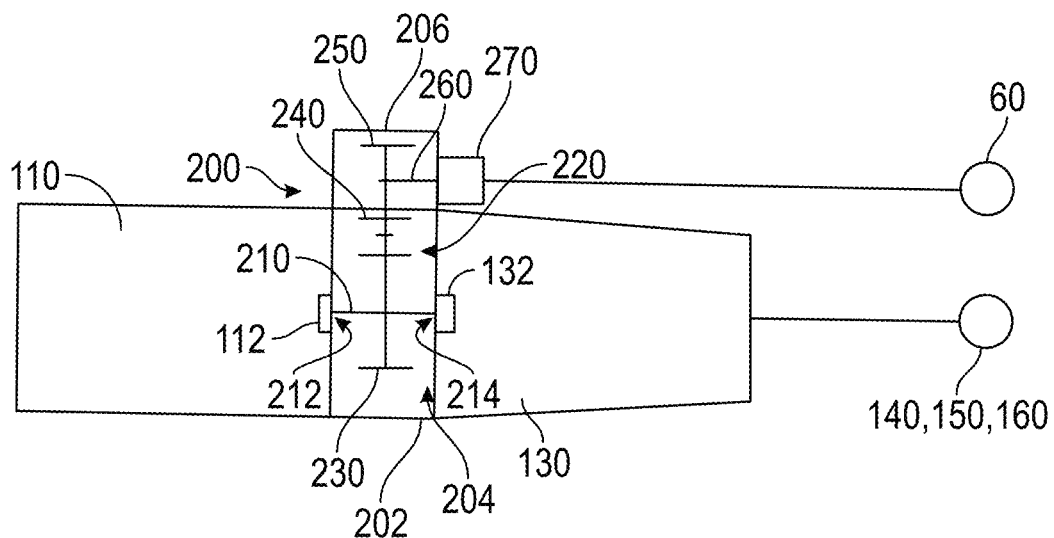
FIGS. 5 and 6 are various schematic drawings of the portion of the driveline of FIG. 4, according to an exemplary embodiment.
Figure 6:
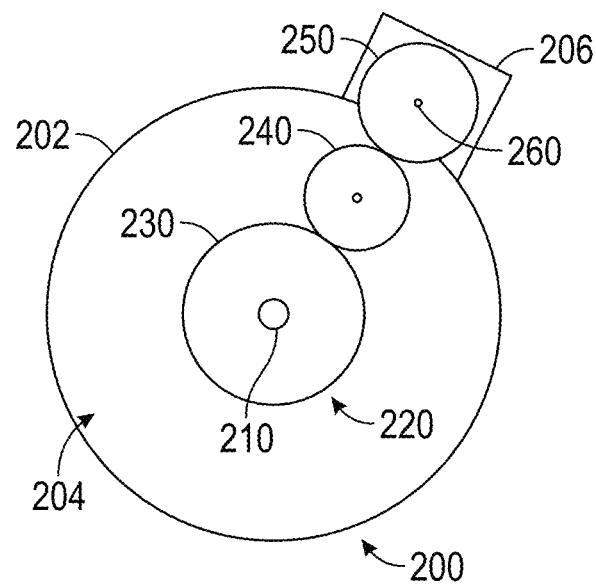
Figure 7:
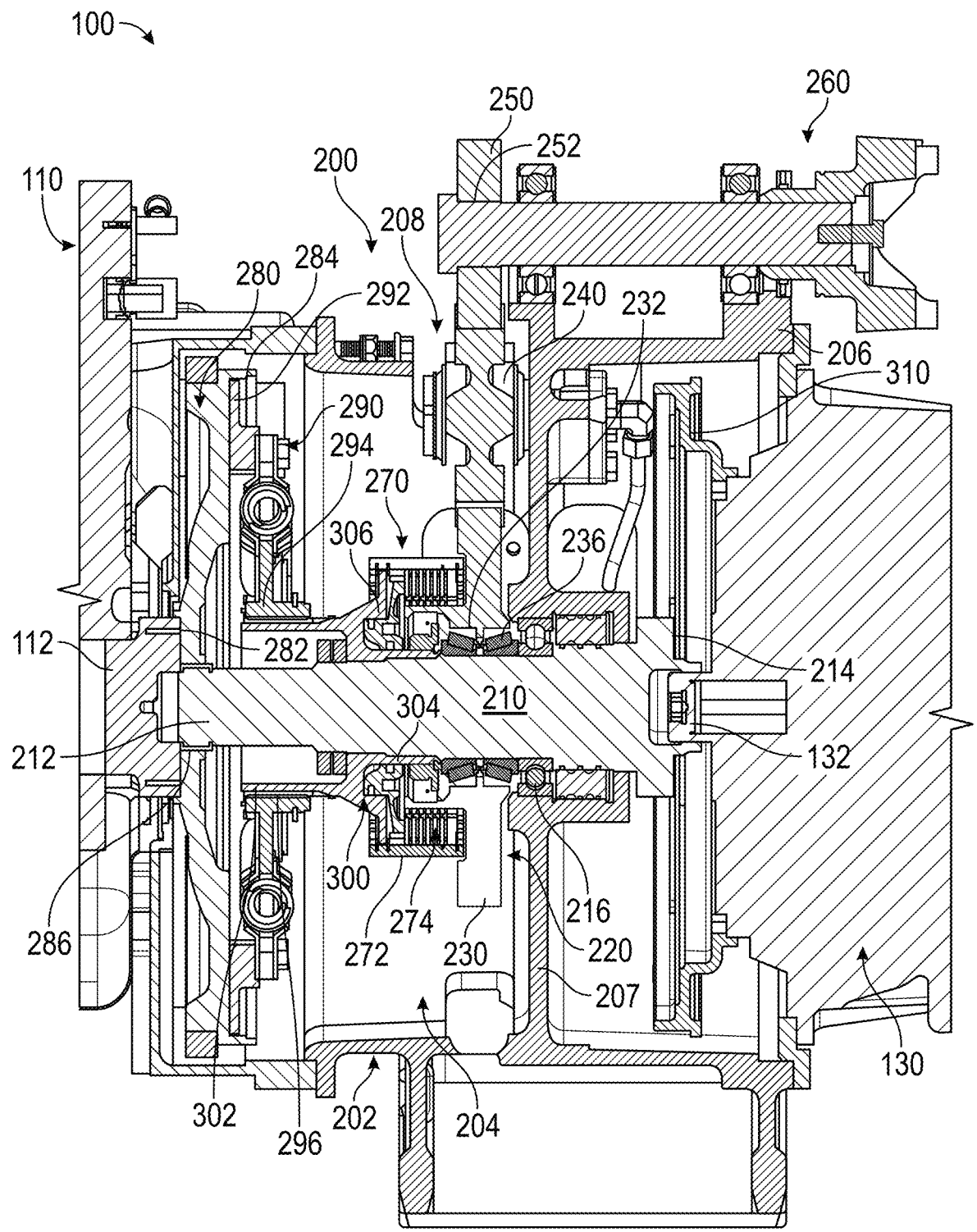
FIG. 7 is a first cross-sectional view of the portion of the driveline of FIG. 4, according to another exemplary embodiment.

As shown in FIGS. 4-8, the plurality of gears of the pump gear train 220 include a first gear, shown as drive gear 230, coupled to (e.g., disposed along) the main drive shaft 210; a second or intermediate gear, shown as idler gear 240, coupled to the drive gear 230 (e.g., in a meshing engagement); and a third or final gear, shown as output gear 250, coupled to the idler gear 240 (e.g., in a meshing engagement) and the pump drive shaft 260 (e.g., disposed along the pump drive shaft 260). In other embodiments, the pump gear train 220 includes a different number of gears (e.g., two gears, four gears, etc.). As shown in FIGS. 5 and 7, the main drive shaft 210 includes a first end, shown as input end 212, coupled to an output (e.g., a crankshaft, etc.), shown as prime mover output 112, of the prime mover 110 and an opposing second end, shown as output end 214, coupled to an input, shown as transmission input 132, of the transmission 130. Accordingly, driving the main drive shaft 210 with the prime mover 110 facilitates driving (i) the transmission 130 and, thereby, the fire apparatus 10 (e.g., the transfer case 140, the front drive shaft 150, the front axle 16, the rear drive shaft 160, the rear axle(s) 18, etc.) and (ii) the pump gear train 220 and, thereby, the pump drive shaft 260 and the pump of the pump system 60.

According to the exemplary embodiments shown in FIGS. 5 and 7, the sandwiched PTO unit 200 includes a clutch, shown as pump clutch 270, that provides a clutched pump output design. Such clutched pump output designs reduce noise pollution and reduce wear on the pump driveline components (e.g., bearings, gears, chains, etc.) by completely disengaging the pump system 60 from the prime mover 110 when the pump is not in use.

As shown in FIG. 5, the clutched pump output design is an external clutch design where the pump clutch 270 is positioned between the pump drive shaft 260 of the sandwiched PTO unit 200 and the pump of the pump system 60 (e.g., the pump clutch 270 is positioned outside of the main housing 202 of the sandwiched PTO unit 200, the pump clutch 270 is positioned downstream of the pump gear train 220, etc.). Accordingly, the pump clutch 270 in the external clutch design can be disengaged when the pump is not in use to decouple the pump drive shaft 260 from the pump system 60 so that the pump system 60 is not unnecessarily driven by the sandwiched PTO unit 200 when the pump is not in use.

As shown in FIG. 7, the clutched pump output design is an internal clutch design where the pump clutch 270 is positioned (i) within the main chamber 204 of the main housing 202 of the sandwiched PTO unit 200 and (ii) upstream of the pump drive shaft 260 and the pump gear train 220 (e.g., between the main drive shaft 210 and the pump gear train 220). Accordingly, the pump clutch 270 in the internal clutch design can be disengaged when the pump is not in use to decouple the pump gear train 220, the pump drive shaft 260, and the pump system 60 from the main drive shaft 210 such that (i) the pump system 60 and (ii) the pump gear train 220 and the pump drive shaft 260 of the sandwiched PTO unit 200 are not unnecessarily driven when the pump is not in use.

As shown in FIG. 7, the sandwiched PTO unit 200 includes a first adapter, shown as prime mover adapter plate 280, a dampening element, shown as dampener 290, a connector or coupler, shown as connector sleeve 300, and a second adapter, shown as transmission adapter plate 310. The prime mover adapter plate 280 defines (i) a first interface, shown as prime mover interface 282, coupled to the prime mover output 112, (ii) a second interface, shown as dampener interface 284, that receives and couples to a portion of the dampener 290, and (iii) a first aperture, shown as central bore 286, that receives the input end 212 of the main drive shaft 210. The dampener 290 includes (i) a first portion, shown as adapter plate portion 292, received by and coupled to the dampener interface 284 of the prime mover adapter plate 280 and (ii) a second portion, shown as sleeve portion 294, that defines a second aperture, shown as central bore 296, that receives a portion of the connector sleeve 300. According to an exemplary embodiment, the dampener 290 is configured to dampen vibrational forces generated by the prime mover 110 such that such vibrational forces are mitigated or eliminated and do not propagate throughout the sandwiched PTO unit 200 (e.g., which reduces rattling of the gears, reduces component wear, etc.).

As shown in FIG. 7, the connector sleeve 300 includes (i) a first portion, shown as dampener interface 302, that extends into the central bore 296 of the dampener 290 to couple the dampener 290 to the connector sleeve 300, (ii) a second portion, shown as shaft interface 304, the engages with a portion of the main drive shaft 210 positioned along a length thereof (e.g., a portion proximate a middle of the main drive shaft 210 but closer to the input end 212 thereof) to couple the main drive shaft 210 to the connector sleeve 300, and (iii) a third portion, shown as clutch interface 306, that engages with a housing, shown as clutch housing 272, of the pump clutch 270 to couple the pump clutch 270 to the connector sleeve 300. The connector sleeve 300 defines a central passage, and similarly the dampener 290 defines the central bore 296, through which the input end 212 of the main drive shaft 210 extends such that (i) the input end 212 is positioned on an upstream or prime mover side of the dampener 290 and the connector sleeve 300 and (ii) the output end 214 of the main drive shaft 210 is positioned on a downstream or transmission side of the dampener 290 and the connector sleeve 300. As shown in FIG. 7, the transmission adapter plate 310 couples the output end 214 of the main drive shaft 210 to the transmission input 132 of the transmission 130.

As shown in FIG. 7, the clutch housing 272 of the pump clutch 270 contains a plurality of clutch plates, shown as clutch plates 274. According to an exemplary embodiment, when the pump clutch 270 is engaged, the clutch plates 274 couple the clutch housing 272, and therefore, the connector sleeve 300, to the drive gear 230 such that rotation of the connector sleeve 300 is to the pump gear train 220 and the pump drive shaft 260 to drive the pump system 60 with the prime mover 110. In one embodiment, the clutch plates 274 are spring biased into a disengaged position and the pump clutch 270 is fluidly operated to overcome the spring bias such that the clutch plates 274 engage with the drive gear 230. In some embodiments, the main drive shaft 210 defines an internal passage that fluidly connects the pump clutch 270 to a fluid source (e.g., a fluid pump, a hydraulic pump, etc.) where the fluid source provides a fluid (e.g., a hydraulic fluid, etc.) to the pump clutch 270 to overcome the spring bias and engage the pump clutch 270. In other embodiments, the pump clutch 270 receives fluid in another suitable manner and/or is otherwise activated/engaged.

According to an exemplary embodiment, when the prime mover 110 provides an input to the sandwiched PTO unit 200 via the prime mover output 112 and the pump clutch 270 is disengaged, the prime mover output 112 drives the prime mover adapter plate 280, the prime mover adapter plate 280 drives the dampener 290, the dampener 290 drives the connector sleeve 300, the connector sleeve 300 drives the main drive shaft 210 and the clutch housing 272 (but not the pump gear train 220), and the main drive shaft 210 drives the transmission adapter plate 310 and the transmission input 132 such that the prime mover adapter plate 280, the dampener 290, the connector sleeve 300, the main drive shaft 210, the transmission adapter plate 310, and the transmission input 132 rotate together so that the prime mover 110 drives the transmission 130 but not the pump gear train 220, the pump drive shaft 260, or the pump system 60.

According to an exemplary embodiment, when the prime mover 110 provides an input to the sandwiched PTO unit 200 via the prime mover output 112 and the pump clutch 270 is engaged, the prime mover output 112 drives the prime mover adapter plate 280, the prime mover adapter plate 280 drives the dampener 290, the dampener 290 drives the connector sleeve 300, the connector sleeve 300 drives the main drive shaft 210 and the clutch housing 272, the main drive shaft 210 drives the transmission adapter plate 310 and the transmission input 132, the clutch housing 272 drives the clutch plates 274, the clutch plates 274 drive the drive gear 230, the drive gear 230 drives the idler gear 240, the idler gear 240 drives the output gear 250, the output gear 250 drives the pump drive shaft 260, and the pump drive shaft 260 drives the pump system 60 such that the prime mover adapter plate 280, the dampener 290, the connector sleeve 300, the main drive shaft 210, the transmission adapter plate 310, the transmission input 132, the pump clutch 270, the pump gear train 220, and the pump drive shaft 260 rotate together so that the prime mover 110 drives the transmission 130 and the pump system 60.

Figure 8:
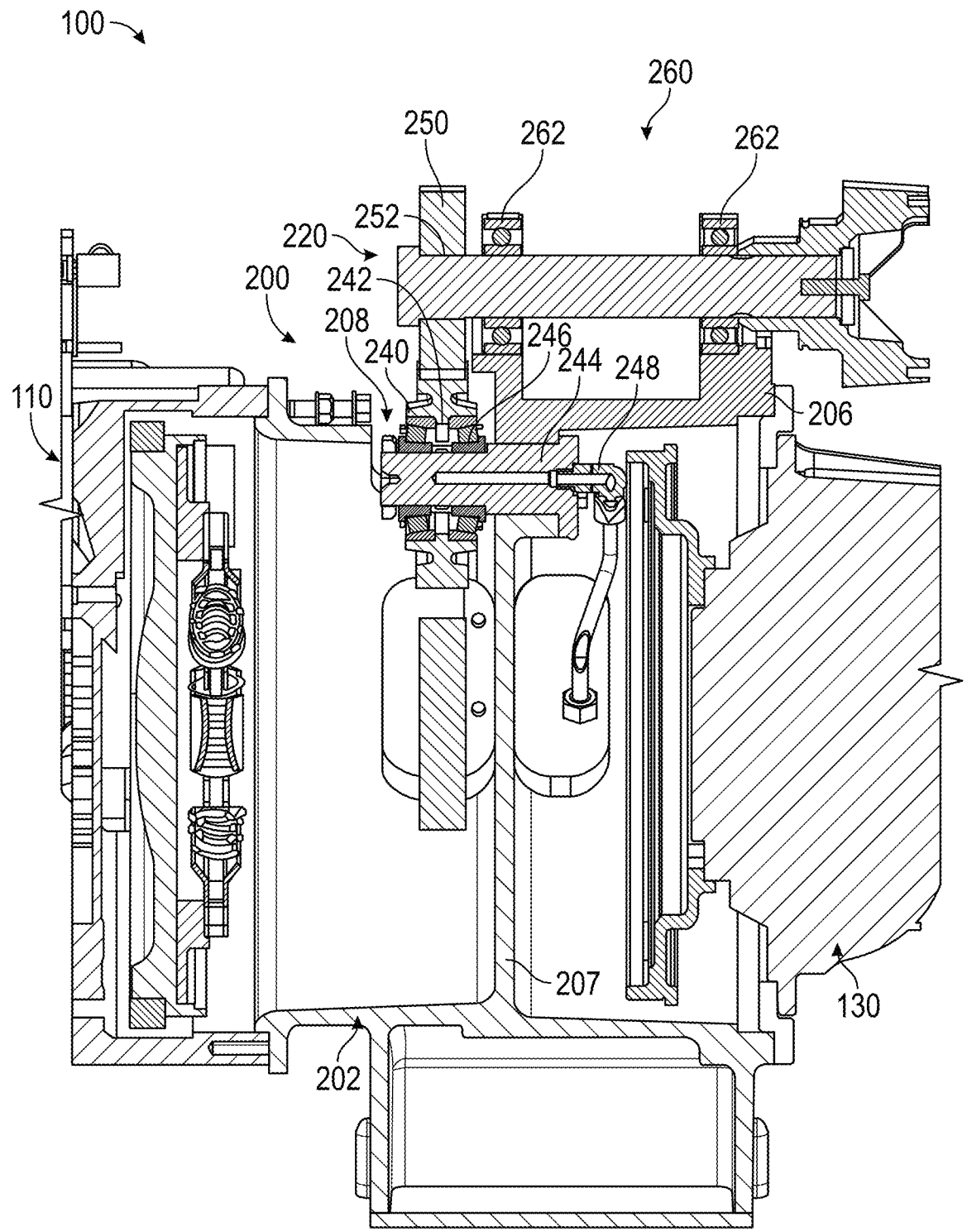
FIG. 8 is a second cross-sectional view of the portion of the driveline of FIG. 7, according to an exemplary embodiment.

As shown in FIGS. 7 and 8, the main housing 202 includes a support, shown as support rib 207, extending from the main housing 202 and into the main chamber 204 thereof. As shown in FIG. 7, the support rib 207 supports a first bearing, shown as main drive shaft bearing 216, positioned along the main drive shaft 210 proximate the output end 214 of the main drive shaft 210 (such that the main drive shaft 210 extends through the support rib 207). According to the exemplary embodiment, the main drive shaft 210 does not include a similar bearing positioned proximate the input end 212 of the main drive shaft 210. Rather, the drive gear 230, the idler gear 240, and the output gear 250 are cut to have a specific helical angle pattern such that the loading imparted onto the main drive shaft 210 and, therefore, onto the prime mover output 112 by the pump gear train 220 is substantially straight down, and not laterally into the prime mover output 112, such that a bearing proximate the input end 212 of the main drive shaft 210 is not necessary to support the loading. Eliminating the need for a bearing proximate the input end 212 of the main drive shaft 210 permits reducing the overall length of the sandwiched PTO unit 200 and, thereby, the overall length of the driveline 100 (e.g., such that the fire apparatus 10 can have a shorter wheel base). By way of example, adding a bearing proximate the input end 212 of the main drive shaft 210 would require extending the length of the sandwiched PTO unit 200 approximately four to six inches to accommodate proper packaging of an additional bearing with the remaining components of the sandwiched PTO unit 200.

As shown in FIG. 7, the drive gear 230 defines an aperture, shown as central bore 232, through which the main drive shaft 210 extends and that receives a second bearing, shown as drive gear bearing 236. According to an exemplary embodiment, the drive gear bearing 236 permits relative rotation between the main drive shaft 210 and the drive gear 230 when the pump clutch 270 is disengaged.

As shown in FIG. 8, the support rib 207 supports an auxiliary shaft, shown as idler shaft 244. The idler gear 240 defines an aperture, shown as central bore 242, through which the idler shaft 244 extends and that receives a third bearing, shown as idler gear bearing 246. According to an exemplary embodiment, the idler gear bearing 246 permits rotation of the idler gear 240 about the idler shaft 244. As shown in FIG. 8, the idler shaft 244 defines an internal passage that couples to a conduit, shown as lubrication conduit 248, which is coupled to a lubrication pump. According to an exemplary embodiment, the lubrication pump is configured to provide lubrication (e.g., oil) to the internal passage of the idler shaft 244, which directs the lubrication to the idler gear 240 to keep the idler gear 240 (and the drive gear 230 and/or the output gear 250) properly lubricated. As shown in FIGS. 7 and 8, the output gear 250 defines an aperture, shown as central bore 252, that receives a portion of the pump drive shaft 260 to couple the output gear 250 thereto. As shown in FIG. 8, the sandwiched PTO unit 200 includes fourth bearings, shown as pump drive shaft bearings 262, supported by the pump output housing 206 and coupled to and supporting the pump drive shaft 260.

Pump Brake System

As shown in FIGS. 12-15, the driveline 100 includes a driveline brake or pump brake assembly (e.g., disc brake assembly, a drum brake assembly, an air/pneumatic brake assembly, a hydraulic brake assembly, etc.), shown as pump brake system 276. According to an exemplary embodiment, the pump brake system 276 is positioned and is selectively engagable to prevent inadvertent driving or rotation of the pump system 60 when the pump system 60 is not in use (e.g., to prevent dry running of the pump system 60).

Figure 12:
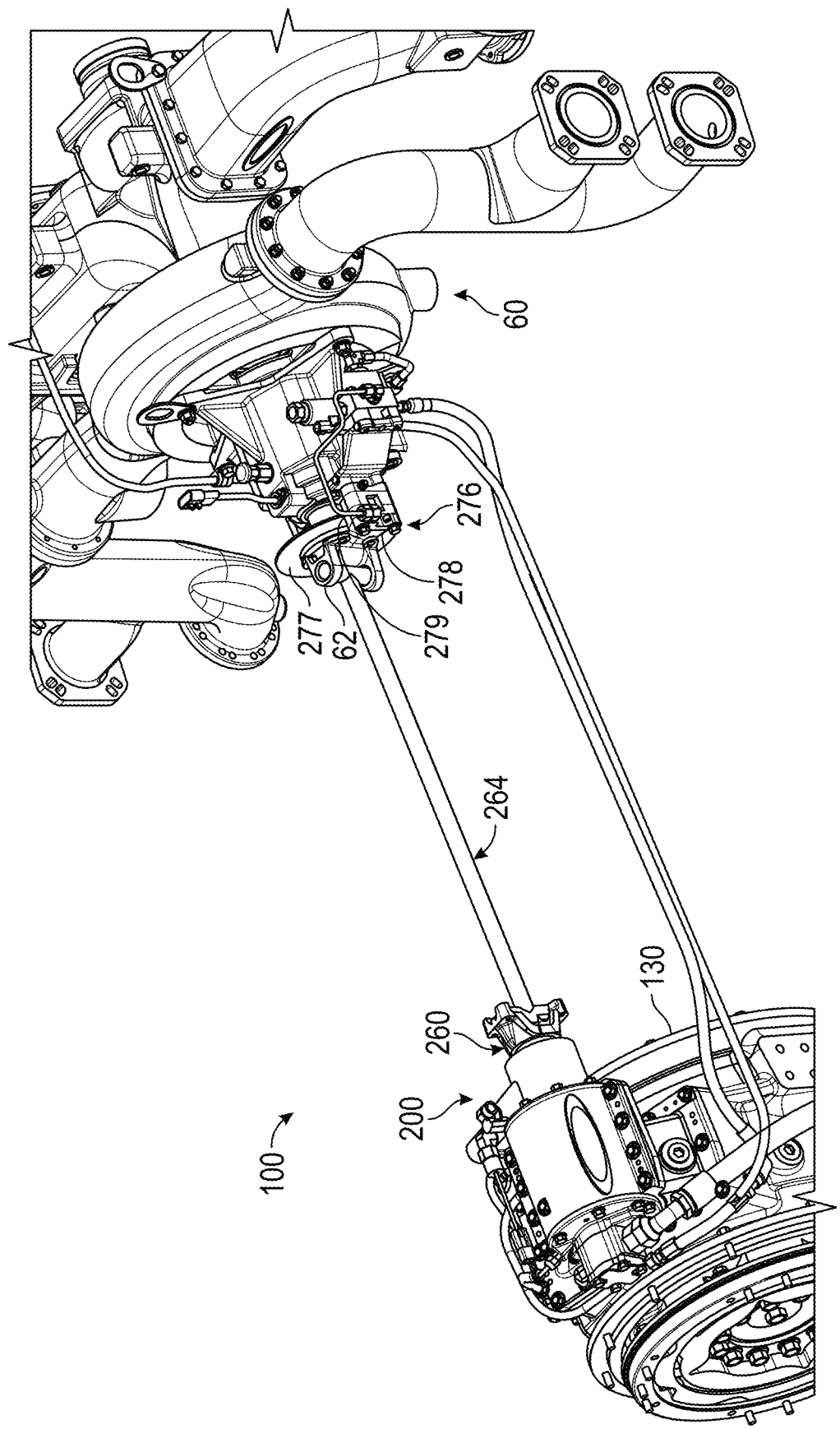
FIG. 12 is a perspective view of a portion of the driveline of FIG. 3 including a pump system, a transmission, a power divider, and a brake system, according to an exemplary embodiment
Figure 13:
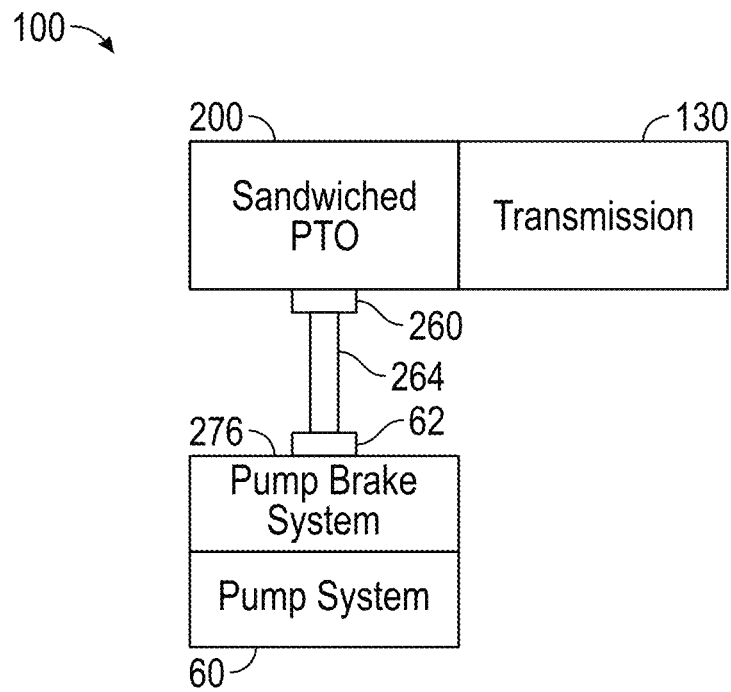
FIG. 13 is a schematic drawing of the portion of the driveline of FIG. 12, according to an exemplary embodiment.
Figure 14:
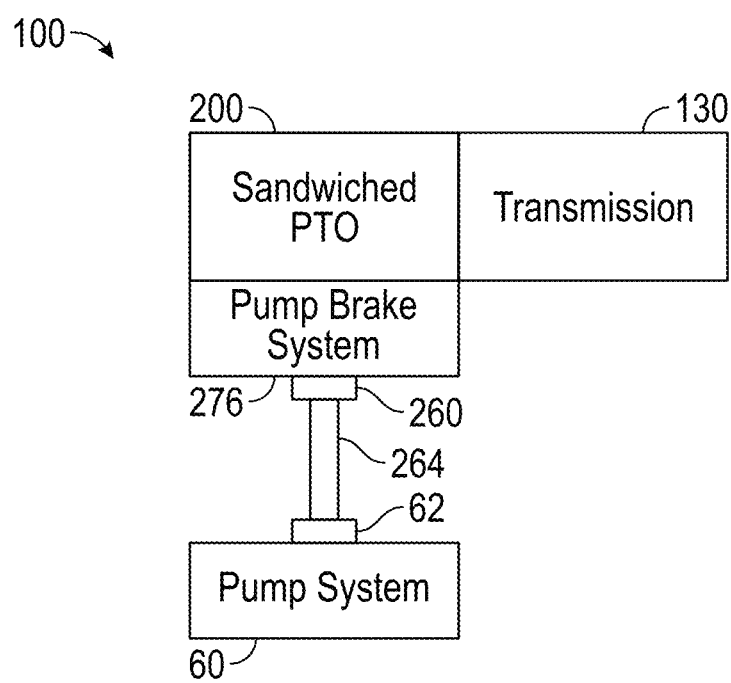
FIG. 14 is a schematic drawing of the portion of the driveline of FIG. 12, according to another exemplary embodiment.
Figure 15:
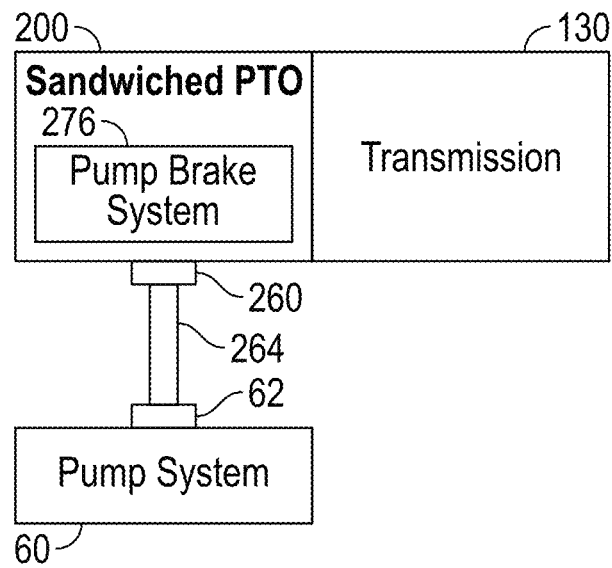
FIG. 15 is a schematic drawing of the portion of the driveline of FIG. 12, according to another exemplary embodiment.

As shown in FIGS. 12 and 13, the pump brake system 276 is positioned between the sandwiched PTO unit 200 and the pump system 60. More specifically, (i) a connector, shown as connecting shaft 264, extends between the pump drive shaft 260 of the sandwiched PTO unit 200 and a pump input, shown as pump input shaft 62, of the pump system 60 and (ii) the pump brake system 276 is positioned at or along the pump input shaft 62 (e.g., the pump brake system 276 is positioned proximate but outside of the pump system 60, etc.). As shown in FIG. 14, the pump brake system 276 is positioned along the pump drive shaft 260 of the sandwiched PTO unit 200 (e.g., the pump brake system 276 is positioned outside of the main housing 202 of the sandwiched PTO unit 200, etc.). In some embodiments, the pump brake system 276 is positioned along the connecting shaft 264. As shown in FIG. 15, the pump brake system 276 is disposed within the main chamber 204 of the sandwiched PTO unit 200 (e.g., the pump brake system 276 is positioned inside of the main housing 202 of the sandwiched PTO unit 200, coupled to the pump gear train 220, coupled to the pump clutch 270, an internal fluidly-operated braking mechanism, etc.).

As shown in FIG. 12, the pump brake system 276 includes (i) first, rotational component, shown as rotor 277, coupled to the pump input shaft 62 (or the connecting shaft 264, or the pump drive shaft 260) and (ii) a second braking or clamping mechanism, shown as brake caliper 278, including a brake pad 279. The rotor 277 is configured to rotate with the pump input shaft 62, the connecting shaft 264, and the pump drive shaft 260. In some embodiments, the rotor 277 is integrally formed with the pump input shaft 62, the connecting shaft 264, or the pump drive shaft 260. According to an example embodiment, the brake caliper 278 is rotationally fixed such that the rotor 277 rotates relative to the brake caliper 278. According to the exemplary embodiment shown in FIG. 12, the pump brake system 276 includes a single brake caliper 278 positioned about the rotor 277. In some embodiments, the pump brake system 276 includes a plurality of brake calipers 278 (e.g., two, three, four, etc.) positioned about the rotor 277. In some embodiments, the driveline 100 includes a plurality of pump brake systems 276 (e.g., one or more positioned along the pump input shaft 62, one or more positioned along the connecting shaft 264, one or more positioned along the pump drive shaft 260, etc.).

According to an exemplary embodiment, the brake caliper 278 includes a brake piston that is actuatable to reposition the brake pad 279 and provide a clamping force to the rotor 277. In one embodiment, the brake piston is a hydraulic actuator that is hydraulically actuated. In another embodiment, the brake piston is a pneumatic actuator that is pneumatically actuated. In still another embodiment, the brake piston is an electric actuator that is electrically actuated. To engage the pump brake system 276, the brake piston included in the brake caliper 278 actuates and engages the brake pad 279 with the rotor 277 to provide a clamping force thereto such that the pump drive shaft 260 does not drive the pump system 60.

According to an exemplary embodiment, the pump brake system 276 is configured to be engaged when the pump system 60 is not in use or when the pump clutch 270 may be inadvertently engaged. By way of example, the pump clutch 270 may be inadvertently engaged at low operating temperatures (e.g., below freezing). For example, in embodiments where the pump clutch 270 is fluidly operated, the viscosity of the fluid therein may increase. Such increase in viscosity may cause the clutch plates 274, even when disengaged, to impart rotational forces from the sandwiched PTO unit 200 to the pump system 60. However, it may be undesirable to drive the pump system 60 when no fluid (e.g., water, agent, etc.) is being pumped by the pump system 60 from a fluid source (e.g., the water tank 80, the agent tank, an external source such as a fire hydrant, etc.). Such dry running of the pump system 60 may be disadvantageous because the fluid driven through the pump system 60 typically acts as a lubricant and cools the components within the pump system 60 (e.g., pump, impellers, gears, etc.). Dry running the pump by driving the pump system 60 without fluid may cause damage (e.g., overheating, abrasion, increased wear, etc.) to the pump system 60 and the components housed within. Accordingly, the pump brake system 276 is configured to facilitate preventing such a dry running scenario.

In some embodiments, the pump brake system 276 is not sized to provide a braking force to slow the rotational speed of the pump drive shaft 260 (e.g., when pumping operations are stopped) from an operating speed (e.g., a high operational speed, greater than 1000 RPM, greater than 3000 RPM, etc.) to a stopped state or speed. Rather, in such embodiments, the pump brake system 276 is sized to provide a holding force to hold the pump input shaft 62 stationary once the pump input shaft 62 has slowed below a certain speed threshold (e.g., near zero RPM, less than 500 RPM, less than 1000 RPM, etc.), after a certain amount of time has elapsed since stopping pumping operations (e.g., such that the speed has sufficiently slowed or stopped), or once is it determined that the pump system 60 has fully stopped. In other embodiments, the pump brake system 276 is sized to provide the braking force to slow the rotational speed of the pump drive shaft 260 from the operating speed, in addition to providing the holding force.

Control System

Figure 16:
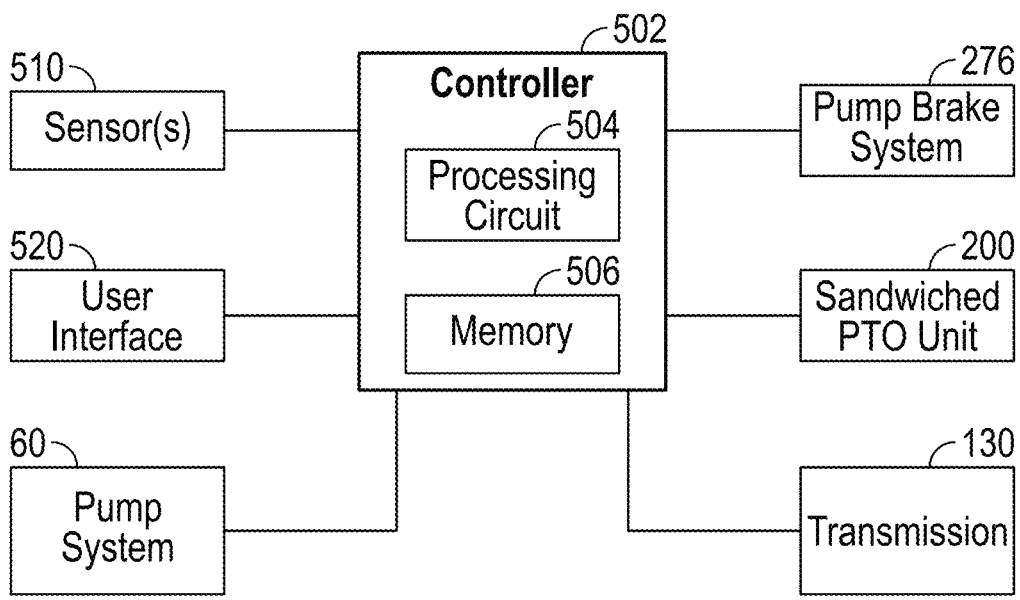
FIG. 16 is a schematic drawing of a control system of the vehicle of FIG. 1, according to an exemplary embodiment.

According to the exemplary embodiment shown in FIG. 16, a control system 500 for the fire apparatus 10 includes a controller 502. As shown in FIG. 16, the controller 502 is coupled to (e.g., communicably coupled to) the pump system 60, the transmission 130, the sandwiched PTO unit 200, the pump brake system 276, one or more sensors, shown as sensors 510, and an input/output device, shown as user interface 520. By way of example, the controller 502 may send and receive signals (e.g., control signals) with the pump system 60, the transmission 130, the sandwiched PTO unit 200, the pump brake system 276, the sensors 510, and/or the user interface 520.

The controller 502 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 16, the controller 502 includes a processing circuit 504 and a memory 506. The processing circuit 504 may include an ASIC, one or more FPGAs, a DSP, circuits containing one or more processing components, circuitry for supporting a microprocessor, a group of processing components, or other suitable electronic processing components. In some embodiments, the processing circuit 504 is configured to execute computer code stored in the memory 506 to facilitate the activities described herein. The memory 506 may be any volatile or non-volatile computer-readable storage medium capable of storing data or computer code relating to the activities described herein. According to an exemplary embodiment, the memory 506 includes computer code modules (e.g., executable code, object code, source code, script code, machine code, etc.) configured for execution by the processing circuit 504. In some embodiments, the controller 502 may represent a collection of processing devices. In such cases, the processing circuit 504 represents the collective processors of the devices, and the memory 506 represents the collective storage devices of the devices.

The user interface 520 may be positioned within the front cabin 30 of the fire apparatus 10 and/or proximate the pump house within which the pump system 60 is positioned. The user interface 520 may include a cabin display and various controls (e.g., buttons, switches knobs, levers, joysticks, etc.). In some embodiments, the user interface 520 further includes touchscreens, a steering wheel, an accelerator pedal, and/or a brake pedal, among other components. The user interface 520 may provide an operator with the control capabilities over the fire apparatus 10. The user interface 520 includes a display and an operator input, according to one embodiment. The display may be configured to display a graphical user interface, an image, an icon, or still other information. In one embodiment, the display includes a graphical user interface configured to provide general information about the fire apparatus 10 (e.g., vehicle speed, fuel level, battery level, pump performance/status, aerial ladder information, warning lights, agent levels, water levels, etc.). The graphical user interface may also be configured to display a current mode of operation, various potential modes of operation, or still other information relating to the fire apparatus 10 and/or the pump brake system 276. By way of example, the graphical user interface may be configured to provide specific information regarding the operation of the pump brake system 276 (e.g., whether the pump brake system 276 is engaged, whether the pump clutch 270 is engaged, whether the pump system 60 is in operation, etc.).

The operator input may be used by an operator to provide commands to the components of the fire apparatus 10, the pump system 60, the sandwiched PTO unit 200, the pump brake system 276, and/or still other components or systems of the fire apparatus 10. The operator input may include one or more additional buttons, knobs, touchscreens, switches, levers, joysticks, pedals, or handles. In some instances, an operator may be able to press a button and/or otherwise interface with the operator input to command the controller 502 to engage the pump system 60, the pump clutch 270, the pump brake system 276, and/or still other components for the fire apparatus 10. The operator may be able to manually control some or all aspects of the operation of the pump system 60, the pump clutch 270, the pump brake system 276, and/or other components of the fire apparatus 10 using the display and the operator input. It should be understood that any type of display or input controls may be implemented with the systems and methods described herein.

The sensors 510 may include one or more sensors that are configured to acquire sensor data to facilitate monitoring operational parameters/characteristics of the fire apparatus 10, the pump system 60, the transmission 130, the sandwiched PTO unit 200, the pump brake system 276, and/or still other components or systems of the fire apparatus 10 with the controller 502. By way of example, the sensors 510 may include one or more sensors (e.g., a speed sensor, a temperature sensor, a viscosity sensor, etc.) that are configured to facilitate monitoring operational parameters/characteristics of the sandwiched PTO unit 200 and/or the pump brake system 276 (e.g., pump drive shaft 260 rotational speed, temperature of the fluid received by the pump clutch 270, viscosity of the fluid received by the pump clutch 270, etc.). By way of another example, the sensors 510 may additionally or alternatively include one or more sensors (e.g., speed sensors, flow rate sensors, pressure sensors, water level sensors, agent level sensors, position sensors, etc.) that are configured to facilitate monitoring operational parameters/characteristics of the pump system 60 (e.g., pump speed, output fluid flow rate, output fluid pressure, water level, agent level, etc.). In some embodiments, the controller 502 is configured to automatically engage the pump brake system 276 and/or recommend to an operator via the user interface 520 to approve a change to the engagement of the pump brake system 276 based on the sensor data.

In some embodiments, the controller 502 is configured to automatically disengage the pump brake system 276 when operation of the pump system 60 is engaged or activated. In some embodiments, the controller 502 is configured to prevent operation or activation of the pump system 60 while the pump brake system 276 is engaged (e.g., waits for an operator to disengage the pump brake system 276, provides a notification to deactivate the pump brake system 276 to permit activation of the pump system 60, etc.). In some embodiments, the controller 502 is configured to automatically engage the pump brake system 276 in response to (i) the pump system 60 being deactivated and (ii) the speed of the pump system 60 being less than a threshold braking speed (e.g., substantially zero, less than 500 RPM, less than 1000 RPM, etc.). In some embodiments, the controller 502 is configured to automatically engage the pump brake system 276 in response to (i) the pump system 60 being deactivated and (ii) the speed of the pump system 60 being zero or substantially zero (e.g., less than 100 RPM). In some embodiments, the controller 502 is configured to automatically engage the pump brake system 276 in response to (i) the pump system 60 being deactivated and (ii) an elapsed time since deactivation being greater than a time threshold (e.g., such that enough time has passed to substantially slow the pump system 60 to zero speed or less than the threshold braking speed). In some embodiments, the controller 502 is configured to additionally or alternatively engage the pump brake system 276 in response to (i) the pump system 60 being deactivated and (ii) the ambient temperature being less than a temperature threshold. In some embodiments, the controller 502 is configured to engage the pump brake system 276 in response to the pump system 60 being deactivated regardless of the speed of the pump system 60 (e.g., such that the pump brake system 276 provides the braking force and the holding force).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Language such as the phrase "at least one of X, Y, and Z" and "at least one of X, Y, or Z," unless specifically stated otherwise, is understood to convey that an element may be either X; Y; Z; X and Y; X and Z; Y and Z; or X, Y, and Z (i.e., any combination of X, Y, and Z). Thus, such language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the fire apparatus 10 and the systems and components thereof as shown in the various exemplary embodiments is illustrative only. Additionally, any element disclosed in one embodiment may be incorporated or utilized with any other embodiment disclosed herein.

The invention claimed is:

1. A fire apparatus comprising:
   a chassis;
   a cab coupled to the chassis;
   a pump system coupled to the chassis and positioned at least partially behind the cab; and
   a driveline including:
      a prime mover;
      a transmission;
      a sandwiched power take-off unit positioned between (a) the prime mover and (b) the transmission and the pump system; and
      a brake system positioned between the sandwiched power take-off unit and the pump system.

2. The fire apparatus of claim 1, further comprising a connecting shaft extending between a pump drive shaft of the sandwiched power take-off unit and a pump input of the pump system, wherein the brake system includes one or more braking mechanisms, the one or more braking mechanisms positioned at least one of (i) at or along the pump drive shaft of the sandwiched power take-off unit, (ii) at or along the pump input of the pump system, (iii) at or along the connecting shaft, or (iv) within the sandwiched power take-off unit.

3. The fire apparatus of claim 2, wherein the sandwiched power take-off unit includes:
   a housing;
   a main drive shaft positioned within the housing and between the prime mover and the transmission, wherein the pump drive shaft is positioned outside of the housing;
   a gear train including a plurality of gears that couple the main drive shaft to the pump drive shaft; and
   a clutch positioned to decouple the main drive shaft from the gear train.

4. The fire apparatus of claim 2, wherein at least one of the one or more braking mechanisms is positioned at or along the pump drive shaft of the sandwiched power take-off unit.

5. The fire apparatus of claim 2, wherein at least one of the one or more braking mechanisms is positioned at or along the connecting shaft.

6. The fire apparatus of claim 2, wherein at least one of the one or more braking mechanisms is positioned at or along the pump input of the pump system.

7. The fire apparatus of claim 2, wherein at least one of the one or more braking mechanisms is positioned within the sandwiched power take-off unit.

8. The fire apparatus of claim 1, further comprising a controller configured to control engagement or disengagement of the brake system.

9. The fire apparatus of claim 8, wherein the controller is configured to automatically disengage the brake system when operation of the pump system is engaged or activated.

10. The fire apparatus of claim 8, wherein the controller is configured to prevent operation or activation of the pump system while the brake system is engaged.

11. The fire apparatus of claim 8, wherein the controller is configured to automatically engage the brake system in response to (i) the pump system being deactivated and (ii) an elapsed time since deactivation being greater than a time threshold.

12. The fire apparatus of claim 8, wherein the controller is configured to automatically engage the brake system in response to (i) the pump system being deactivated and (ii) an ambient temperature being less than a temperature threshold.

13. The fire apparatus of claim 8, wherein the controller is configured to automatically engage the brake system in response to (i) the pump system being deactivated and (ii) a speed of the pump system being less than a threshold braking speed.

14. The fire apparatus of claim 13, wherein the threshold braking speed is zero or substantially zero.

15. The fire apparatus of claim 14, wherein the brake system is not sized to brake the pump system from an operating speed.

16. A fire apparatus comprising:
   a pump system; and
   a driveline including:
      a prime mover;
      a transmission;
      a sandwiched power take-off unit including:
         a housing;
         a main drive shaft positioned within the housing and between the prime mover and the transmission;
         a pump drive shaft positioned outside of the housing and coupled to a pump input of the pump system;

a gear train including a plurality of gears that couple the main drive shaft to the pump drive shaft; and
a clutch positioned to decouple the main drive shaft from the gear train; and
a brake system configured to provide a holding force to facilitate holding the pump system in a stopped state.

17. The fire apparatus of claim 16, further comprising a controller configured to control engagement or disengagement of the brake system.

18. The fire apparatus of claim 17, wherein the controller is configured to automatically engage the brake system in response to (i) the pump system being deactivated and (ii) a speed of the pump system being less than a threshold braking speed.

19. The fire apparatus of claim 18, wherein the controller is configured to automatically disengage the brake system when operation of the pump system is engaged or activated.

20. A fire apparatus comprising:
a pump system;
a driveline including:
a prime mover;
a transmission;
a sandwiched power take-off unit including:
a housing;
a main drive shaft positioned within the housing and between the prime mover and the transmission;
a pump drive shaft positioned outside of the housing and coupled to a pump input of the pump system;
a gear train including a plurality of gears that couple the main drive shaft to the pump drive shaft; and
a clutch positioned to decouple the main drive shaft from the gear train;
a connecting shaft extending between the pump drive shaft and the pump input; and
a brake system positioned at or along at least one of the pump drive shaft, the connecting shaft, or the pump input; and
a controller configured to automatically engage the brake system in response to (i) the pump system being deactivated and (ii) at least one of (a) a speed of the pump system being less than a threshold braking speed or (b) an elapsed time since deactivation being greater than a time threshold to provide a holding force with the brake system to facilitate holding the pump system in a stopped state.

\* \* \* \* \*